UNITED STATES PATENT OFFICE.

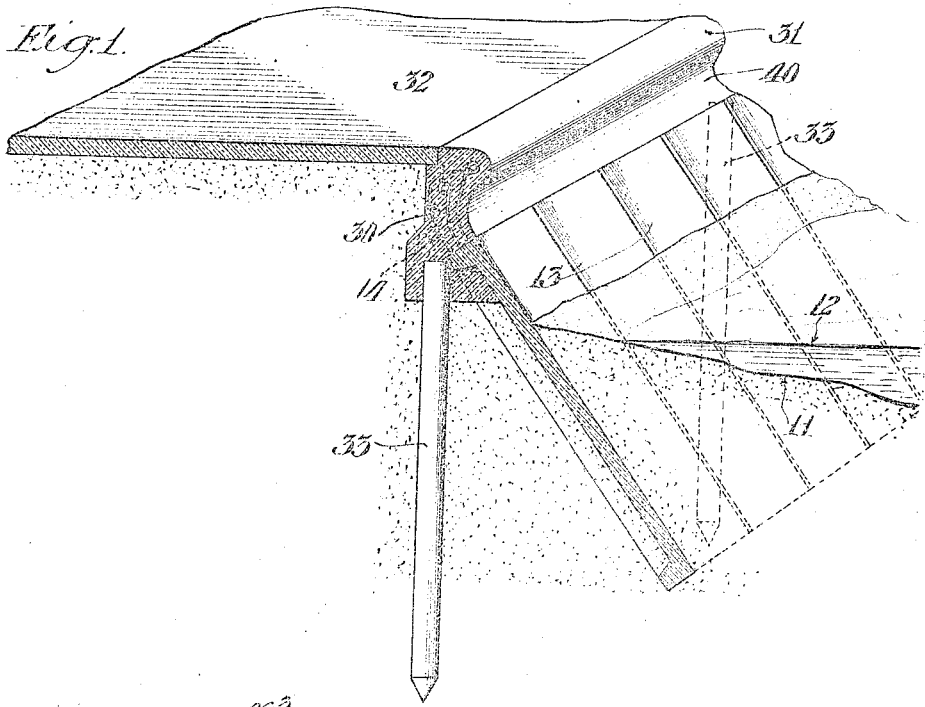

HENRY W. SCHLUETER, OF VENICE, CALIFORNIA.

CONCRETE SEA-WALL.

1,205,810.  Specification of Letters Patent.  Patented Nov. 21, 1916.

Application filed December 15, 1915. Serial No. 67,057.

*To all whom it may concern:*

Be it known that I, HENRY W. SCHLUETER, a citizen of the United States, residing at Venice, in the county of Los Angeles and State of California, have invented a new and useful Concrete Sea-Wall, of which the following is a specification.

My invention relates to the art of protecting the ocean front against the destructive action of waves.

On shores which are subjected to high tides and heavy seas there is often a very pronounced eroding action during storms, the waves cutting away large portions of the beach and damaging surrounding property.

To protect the shore against the action of the sea, sea walls of various kinds have been built, practically all of them presenting a sloping surface ending in an upwardly extending curve against which the waves break and spend their force.

The principal object of my invention is to produce a sea wall having these general characteristics, but embodying certain new forms of construction.

In the previous forms of sea wall concrete or stone walls have been built which were practically continuous and some of which were of very considerable length. Where concrete walls of this character have been built there is great likelihood of cracking due to uneven settling thereof, or due to unequal expansion under the action of the sun. The latter is especially likely to occur as the upper part of the wall is often exposed to high temperatures where the bottom is buried in wet sand.

In my invention I provide a sea wall which is made up of a plurality of panels, these panels being loosely tied together along their edges and solidly tied into a continuous girder which runs along the top.

The principal difficulty in building sectional sea walls has been the liability of the sand being washed out through the openings between the panels under the scouring action of the heavy seas. It should be understood that at times of heavy storms the velocity of the water, as a wave breaks, is very great, and in previous forms of sectional sea walls the force of such waves has been sufficient to penetrate the openings between the sections, washing out the sand behind the wall and eventually causing bad cave-ins in the rear thereof. Practically all sea walls are also retaining walls, the shore being built up behind them so that there is a considerable pressure tending to force them out seawardly. This condition is increased by the action of water which gets in behind the wall and exerts a hydrostatic pressure thereon. By the use of a sectional sea wall this water is allowed to escape through the opening between the sections so that there is no danger of injuring the wall by this pressure.

In my invention I provide a special form of locking groove for tying the various sections together, this groove in reality forming a pair of drain grooves through which it is practically impossible for the force of waves to penetrate with any velocity and down which the water from the breaking waves is allowed to run without danger of cutting out the material behind the wall. The sea wall is inclined so that it acts as a sort of roof turning the water which is projected against it, but allowing a free interchange of pressure between the space on either side.

Further objects and advantages will be made evident hereinafter.

In the drawings, which are for illustrative purposes only, Figure 1 is a perspective view, partly in section, of a small portion of a sea wall constructed in accordance with my invention. Fig. 2 is a view of the bottom of the panels showing the general arrangement thereof. Fig. 3 is an enlarged section on a plane represented by the line $x^3$—$x^3$ of Fig. 2, this plane being viewed in the direction of the arrows. Fig. 4 is a sectional view on a plane represented by the line $x^4$—$x^4$ of Fig. 3, this plane being viewed in the direction of the arrows.

The method of construction of my wall is best shown in Fig. 1 in which—

11 represents the natural beach line, and 12 represents the surface of the ocean under normal conditions. It is, of course, understood, that in times of storm and high tide the level 12 is considerably raised and heavy waves break against the wall structure.

The wall structure consists of a plurality of panels 13, these panels being formed of concrete and having vertical reinforcing rods 14 embedded therein, these vertical reinforcing rods being tied together with horizontal reinforcements 15 as best shown in Fig. 4. The inner side of each panel has a cavity 16 formed therein, these cavities being for the purpose of saving material and lightening the construction. The panels are all of practically the same shape and size, each panel having a grooved edge 17 and a tongued edge 18, the grooved edge of one panel fitting about the tongued edge of an adjacent panel for the purpose of locking the panels together. The configuration of the tongue and groove is such that a tortuous channel is formed between the panels when erected. This tortuous channel consists of a straight entering portion 20, a primary drain groove 21, a return bend 22, a straight central portion 23, a secondary drain groove 24, a secondary return groove 25, and an internal straight portion 26 which terminates in a wedge shaped gravel groove 27. The vertical reinforcement 14 is allowed to project from the ends of the slab and is carried up and secured to girder reinforcements 30, the girder reinforcement being best shown in Fig. 1. The girder reinforcement is embedded in a longitudinal girder 31 on which a pavement 32 may be partially supported. Piling 33 is driven to better support and brace the sea wall. The space back of the wall is filled with sand, gravel, rock, or any of the other materials making up the shore. The girder 31 is formed in a return bend as shown at 40, so that the waves which break on the lower portion thereof and on the grooved face of the panels 13 are thrown back and outwardly. The girder 31 extends back of the panels 13 and downwardly around the piles 33.

The method of operation of my invention is somewhat peculiar, and requires a careful explanation. With a sea wall erected in accordance with my invention it is possible to direct a heavy stream of water on the face of the wall without any of this water spurting through and washing out the material behind. This is due to the peculiar configuration of the openings between the panels. The force of the water striking against the face of the panels enters the straight portion 20 of these grooves with its full force and enters the primary drain 21. Due to the shape of the sides of the grooves, cross currents are set up in the water, so that very little of it gets by the primary drain 21, the force of the water being almost wholly expended by the time it reaches this drain. As the panels are inclined, the water runs slowly down in the primary drain 21 without passing through into the filling material behind the sea wall. Should there be any considerable tendency for water to get by the primary drain 21, the force of this water is still further expended in the return bend 22 and the straight portion 23, so that when it reaches the secondary drain groove 24 it is wholly stagnant and runs down in this drain groove and escapes through the face of the wall. I believe that I have discovered a new principle in sea wall construction which allows me to make up panels which are loosely tied together so that they have some flexibility and which will successfully resist the heaviest storms. To further assist in this useful result, I provide a wedge-shaped gravel groove 27, this groove being for the purpose of preventing the escape of any material from the rear of the sea wall. This groove provides a space into which relatively large particles of sand or gravel will become wedged so as to form a sieve through which water may escape from the back of the sea wall without danger of carrying off the finer particles of material from the backing.

I claim as my invention:—

1. A sea wall comprising a continuous horizontal girder to which are secured a series of inclined panels, said panels being loosely tied together by means of a tongue and groove, said tongue and groove forming an open tortuous passage through the sea wall said tortuous passage consisting of a straight entering portion, a primary drain groove, a primary return bend, a straight central portion, a secondary drain groove, a secondary return bend and a wedge shaped gravel groove.

2. A sea wall comprising a continuous horizontal girder to which are secured a series of inclined panels, said panels being loosely tied together by means of a tongue and groove, said tongue and groove forming an open tortuous passage through the sea wall, said tortuous passage consisting of a straight entering portion, a primary drain groove, a primary return bend, a straight central portion, a secondary drain groove, a secondary return bend, and a wedge shaped gravel groove, said primary and secondary drain grooves being so formed that they drain off any water which is projected against the sloping face of the panels.

In testimony whereof, I have hereunto set my hand at Los Angeles, California, this 10th day of December, 1915.

HENRY W. SCHLUETER.